3,322,764
PROCESS FOR PREPARING N-SUBSTITUTED 2 - AMINOBENZOPHENONES UTILIZING 4-PHENYLQUINAZOLINES
Werner Metlesics, Clifton, and Leo Henryk Sternbach, Upper Montclair, N.J., assignors to Hoffmann-La Roche Inc., Nutley, N.J., a corporation of New Jersey
No Drawing. Filed July 10, 1963, Ser. No. 294,158
5 Claims. (Cl. 260—251)

The present invention relates to novel chemical methods. More particularly, the invention relates to a new and novel preparation of N-substituted 2-aminobenzophenones utilizing 4-phenylquinazolines.

An object of the present invention is to provide a procedure suitable for the conversion of 4-phenylquinazolines to N-substituted 2-aminobenzophenones.

It is a further object of the present invention to devise a synthesis for the preparation of 5-aryl-3H-1,4-benzodiazepin-2(1H)-ones starting with the said 4-phenylquinazolines and proceeding through the said N-substituted 2-aminobenzophenones.

In achieving this objective within the purview of the present invention, it has been discovered that when a 4-phenylquinazoline compound having the formula of

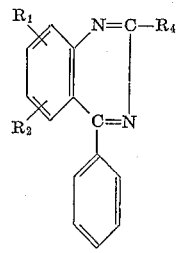

(I)

wherein $R_1$ and $R_2$ are selected from the group consisting of halogen, lower alkyl and hydrogen, and
$R_4$ is selected from the group consisting of hydrogen, lower alkyl, e.g. methyl, and aryl, e.g. phenyl, is treated with a quaternizing agent, and thereafter when the resulting quaternary ammonium compound is hydrolyzed, an N-substituted 2-aminobenzophenone is obtained. In a preferred embodiment, $R_1$ is hydrogen and $R_2$ is chlorine in Formula I above. In a still more preferred embodiment, $R_1$ is hydrogen and $R_2$ is a chlorine atom joined to the quinazoline ring nucleus at the 6-position. Preferably, $R_4$ is phenyl.

The treatment of compounds of Formula I above with the said quaternizing agent yields a quaternary ammonium compound having the general formula of

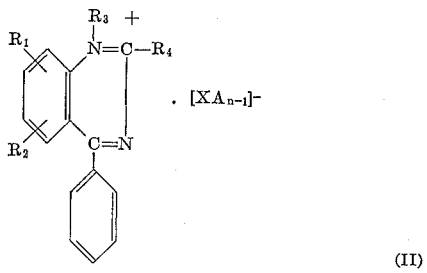

(II)

wherein $R_1$, $R_2$ and $R_4$ are as above; $R_3$ is selected from group consisting of lower alkyl and ar-lower alkyl; A represents a lower alkyl group; X is the anionic moiety of an acid and $n$ is an integer identical to the valence of the anionic moiety X.

Any suitable quaternizing agent may be efficaciously employed in the preparation of compounds of Formula II above from the compounds of Formula I above. Preferably, the quaternizing agent utilized is an ester of an inorganic or an organic acid (sulfuric acid, hydrochloric acid, toluene sulfonic acid and the like) corresponding to the formula of $$R_3XA_{n-1} \quad \text{(III)}$$

wherein $R_3$, A, X and $n$ have the same meaning as ascribed thereto hereinabove. Among the quaternizing agents suitable for the purposes of the present invention can be included lower alkyl sulfates, e.g. dimethyl sulfate, lower alkyl halides, e.g. methyl iodide, aralkyl halides, e.g. benzyl chloride and ring substituted derivatives thereof; lower alkyl phosphates such as trimethyl phosphate; and aryl sulfonic acid esters such as the methyl ester of toluene sulfonic acid.

As is evident from the above, X represents an anion such as, for example, $I^{1-}$, $Cl^{1-}$, arylsulfonate$^{1-}$, $SO_4^{2-}$ and $PO_4^{3-}$. Thus, when X is $I^{1-}$, or arylsulfonate$^{1-}$, $n$ is 1 and when X is $SO_4^{2-}$, $n$ is 2.

In one aspect, the quaternizing agent per se functions as the medium in which the quaternization is effected. In an alternate embodiment, the quarternization proceeds in the presence of a substantially inert organic solvent. Representative of such solvents are lower alkanols such as ethanol, toluene, benzene, dimethylformamide, tetrahydrofuran, chloroform, mixtures thereof and the like. While the temperature at which the reaction proceeds is not critical, it is preferred to operate at a temperature of from about 25° to about 200°, more preferably from about 80° to about 130°.

Compounds of Formula II above are hydrolyzed with or without isolation to produce N-substituted 2-aminobenzophenones having the formula of

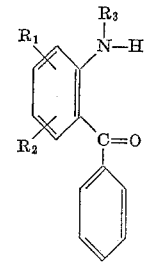

(IV)

wherein $R_1$, $R_2$ and $R_3$ have the same meaning as ascribed thereto hereinabove, by any convenient hydrolysis technique. For example, the quaternary ammonium compound can be converted into the 2-aminobenzophenone in the presence of a conventional hydrolyzing agent such as, for example, water or an alkali metal hydroxide, e.g. sodium hydroxide, potassium hydroxide, or an alkaline earth hydroxide such as calcium hydroxide, or ammonium hydroxide.

The N-substituted 2-aminobenzophenones, produced as a result of the subject process, are valuable intermediates in the preparation of therapeutically useful 5-aryl-3H-1,4-benzodiazepin-2(1H)-ones and can be converted thereto by known techniques. For example, the N-substituted 2-aminobenzophenones of Formula IV above, formed as a result of the hydrolysis of a compound of Formula II above, can be reacted, with or without purification, with an α-halo lower alkanoyl halide to form an N-substituted 2-(α-halo-lower alkanoylamino)-benzophenone which can then be reacted with ammonia to yield the desired benzodiazepin-2(1H)-ones.

The term "halogen" (or "halide"), as employed throughout the instant disclosure, is intended to connote all four halogen atoms, i.e. chlorine, fluorine, bromine and iodine.

The expression "lower alkyl," as employed hereinabove, represents a straight or branch chain lower alkyl group such as methyl, ethyl, propyl, isopropyl, butyl, isobutyl, tertiary butyl and the like. The term "aralkyl" represents, for example, a phenalkyl group such as benzyl, p-chlorobenzyl, o-alkylbenzyl and the like.

The following examples are illustrative of the present invention, but not limitative thereof. The temperatures referred to are all in degree centigrade.

Example 1

A solution of 6 g. (0.019 mole) of 6-chloro-2,4-diphenylquinazoline and 50 ml. of dimethyl sulfate in 100 ml. of toluene was refluxed for 24 hours. A substantial amount of toluene was removed in vacuo and 400 ml. of ether was added to the residue. The solvents were decanted from the brown oil which had deposited. The brown oil remaining after the decantation was added to a mixture of 75 ml. of ethanol and 50 ml. of 2 N sodium hydroxide. The resultant mixture was refluxed for 17 hours. The ethanol was removed in vacuo, the aqueous phase extracted with ether and the ether evaporated. The residue was recrystallized from a mixture of ethanol and water to give 5-chloro-2-methylaminobenzophenone, melting at 94–97°.

A solution of 24.5 g. (0.1 mole) of 2-methylamino-5-chlorobenzophenone in 100 ml. of ether was mixed with 5.5 ml. (0.06 mole) of bromoacetyl bromide. The mixture was allowed to stand for 5 minutes and was then washed with 100 ml. of water. After separating, the process was repeated with 2.2 ml. (0.025 mole) of bromoacetyl bromide and then with smaller portions until the yellow amine color had practically disappeared and further additions of the acylating agent caused no perceptible change in color. A total of 0.18 mole of bromoacetyl bromide was used. The ether layer was dried and concentrated in vacuo. The oil was treated with water (to destroy unreacted bromoacetyl bromide) and hexane. The formed crystals were filtered off, washed with water and then with hexane until colorless. The 2-(2-bromo-N-methylacetamido)-5-chlorobenzophenone obtained was crystallized from a mixture of ether and petroleum ether to yield colorless prisms melting at 95–96°.

A solution of 5.0 g. of 2-(2-bromo-N-methylacetamido)-5-chlorobenzophenone in 22.5 ml. of methanol was added to 52.5 ml. of a 15% methanolic ammonia solution (w./v.). This mixture was left for 45 minutes at room temperature, diluted with 75 ml. of methanol and left standing for an additional 2¼ hours. The mixture was diluted with about 200 ml. of water and extracted with three 100 ml. portions of methylene chloride. The organic layer was washed free of ammonia, dried over sodium sulfate and allowed to stand at room temperature with charcoal for 2 hours. The solution was then concentrated in vacuo to an oil. The residue was crystallized from 25 ml. of ether yielding 7-chloro-1-methyl-5-phenyl-3H-1,4-benzodiazepin-2(1H)-ones, melting point 125–126° (colorless plates).

Example 2

To 3.168 kilos of 2,4-diphenyl-6-chloroquinazoline were added 10.0 l. of dimethyl sulfate. The reaction mixture is heated to 120° with stirring. The temperature is maintained at 120° for 24 hours with continued stirring. The dimethyl sulfate is removed in vacuo and 1-methyl-2,4-diphenyl-6-chloroquinazolinium methyl sulfate formed is permitted to cool. The quaternary ammonium compound is then carefully added to 8.0 l. of ethanol under reflux. To the resultant boiling solution, a mixture of 2.0 l. of 50% (w./w.) sodium hydroxide and 2.0 l. of water is cautiously added. The reaction mixture is stirred for 15 hours under reflux to remove the alcohol, yielding 2-methylamino-5-chlorobenzophenone. The residue is added to 5.0 l. of water and 7.0 l. of toluene with stirring. The aqueous phase is separated and discarded. To the toluene phase is added 2.0 l. of tap water and 1.28 kilos of sodium bicarbonate. The mixture is stirred while 1.0 l. of bromoacetyl bromide is carefully added over a period of approximately 30 minutes. The temperature is maintained below 60°. After the addition of the bromoacetyl bromide is completed, the reaction mixture is warmed at 60° with stirring for 1 hour. The reaction mixture is washed with warm (50° C.) water. The toluene solution is then azeotropically dried under vacuo to a volume of 4.0 l. of solution. The solution is cooled with stirring to 0° for 1 hour and the crystals which separate are filtered out. The crystals are washed and vacuum dried to constant weight at 50°. The product, 2-bromoacetmethamido-5-chlorobenzophenone melts at 93 to 94°. This product can be converted to a benzodiazepine in the manner set out above.

We claim:

1. A process for forming N-substituted 2-aminobenzophenones which comprises reacting at a temperature of from about 25° C. to about 200° C. a 4-phenylquinazoline of the formula

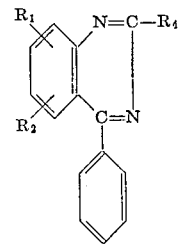

wherein
  $R_1$ and $R_2$ are selected from the group consisting of hydrogen, lower alkyl and halogen; and
  $R_4$ is selected from the group consisting of hydrogen, lower alkyl and phenyl,
with a quaternizing agent selected from the group consisting of lower alkyl sulfates, lower alkyl halides, benzyl halides, halobenzyl halides, lower alkyl-benzyl halides, lower alkyl phosphates and lower alkyl esters of toluene sulfonic acid, and hydrolizing the resulting quaternary ammonium compound.

2. A process which comprises reacting 2,4-diphenyl-6-chloroquinazoline with dimethyl sulfate at a temperature of from about 25° C. to about 200° C. and hydrolizing the resulting product to thereby form 5-chloro-2-methylaminobenzophenone.

3. A process which comprises reacting at a temperature of from about 25° C. to about 200° C., a compound having the formula of

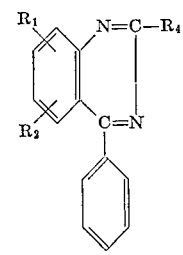

wherein
  $R_1$ and $R_2$ are selected from the group consisting of halogen, lower alkyl and hydrogen; and
  $R_4$ is selected from the group consisting of hydrogen, lower alkyl and phenyl,
with a quaternizing agent selected from the group consisting of lower alkyl sulfates, lower alkyl halides, benzyl halides, halobenzyl halides, lower alkyl benzyl halides, lower alkyl phosphates and lower alkyl esters of toluene sulfonic acid.

4. A compound having the formula of

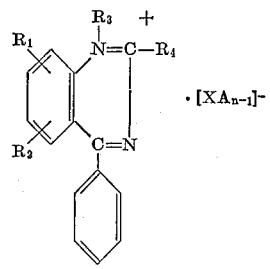

wherein $R_1$ and $R_2$ are selected from the group consisting of halogen, lower alkyl and hydrogen; $R_3$ is selected from the group consisting of lower alkyl, phenyl-lower alkyl, halo-phenyl-lower alkyl and lower alkyl-phenyl-lower alkyl; $R_4$ is selected from the group consisting of hydrogen, lower alkyl and phenyl; A is selected from the group consisting of lower alkyl; X is the anionic moiety of an acid selected from the group consisting of hydrohalic acids, sulfuric acid, phosphoric acid and toluene sulfonic acid and $n$ is an integer identical to the valence of the anionic moiety.

5. A process which comprises hydrolizing a compound having the formula of

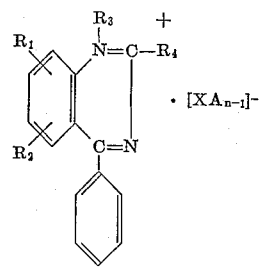

wherein $R_1$ and $R_2$ are selected from the group consisting of halogen, lower alkyl and hydrogen; $R_3$ is selected from the group consisting of lower alkyl, phenyl-lower alkyl, halo phenyl-lower alkyl and lower alkyl phenyl lower alkyl; $R_4$ is selected from the group consisting of hydrogen, lower alkyl and phenyl; A is selected from the group consisting of lower alkyl; X is the anionic moiety of an acid selected from the group consisting of hydrohalic acids, sulfuric acid, phosphoric acid and toluene sulfonic acid and $n$ is an integer identical to the valence of the anionic moiety.

No references cited.

NICHOLAS S. RIZZO, *Primary Examiner.*